United States Patent
Anderson et al.

(10) Patent No.: US 9,928,039 B2
(45) Date of Patent: Mar. 27, 2018

(54) STATEFUL DEVELOPMENT CONTROL

(71) Applicant: International Business Machines Corporation, Armonk, NY (US)

(72) Inventors: Carl T. Anderson, Apex, NC (US); Dario G. Flores Luis, Mexico City (MX); Raquel Maldonado Cabrera, Zapopan (MX); Agueda Martinez Hernandez Magro, Zapopan (MX); Roberto Sanchez Herrera, Guadalajara (MX)

(73) Assignee: International Business Machines Corporation, Armonk, NY (US)

( * ) Notice: Subject to any disclaimer, the term of this patent is extended or adjusted under 35 U.S.C. 154(b) by 161 days.

(21) Appl. No.: 14/957,722

(22) Filed: Dec. 3, 2015

(65) Prior Publication Data
US 2017/0161025 A1    Jun. 8, 2017

(51) Int. Cl.
*G06F 9/44* (2006.01)
(52) U.S. Cl.
CPC .................... *G06F 8/30* (2013.01)
(58) Field of Classification Search
CPC ......................................... G06F 8/30
USPC ........................................ 717/122
See application file for complete search history.

(56) References Cited

U.S. PATENT DOCUMENTS

| | | | |
|---|---|---|---|
| 7,146,608 B1 | 12/2006 | Newman et al. | |
| 7,278,106 B1* | 10/2007 | Mason | G06F 8/71 715/733 |
| 8,078,589 B2* | 12/2011 | Cote | G06F 8/71 707/676 |
| 8,589,859 B2 | 11/2013 | Kaulgud et al. | |
| 8,739,113 B2* | 5/2014 | Packbier | G06F 9/44 717/103 |
| 8,843,878 B1 | 9/2014 | Grundner et al. | |
| 9,430,229 B1* | 8/2016 | Van Zijst | G06F 9/3844 |
| 2010/0017784 A1 | 1/2010 | O'Mahony et al. | |
| 2014/0189641 A1* | 7/2014 | Anderson | G06F 8/60 717/110 |
| 2015/0052501 A1 | 2/2015 | Shani et al. | |
| 2015/0254073 A1* | 9/2015 | Menard | G06F 8/71 717/122 |

(Continued)

OTHER PUBLICATIONS

Kniberg, "Agile version control with multiple teams", published by InfoQ, 2008.*

(Continued)

*Primary Examiner* — Wei Zhen
*Assistant Examiner* — Hossain Morshed
(74) *Attorney, Agent, or Firm* — Teddi E. Maranzano

(57) ABSTRACT

According to an exemplary embodiment, a method for a stateful development control system is provided. The method may include receiving a plurality of product rules that include evolution rules, sets, and states. A state aware software repository is initialized with source code files. The source code files receive a first state of "0" or "1". In response to modifying one or more source code files, a second state is assigned to the modified one or more source code files. In response to assigning the second state, a determination is made whether to perform a merge of the one or more source code files and one or more of the source code files. The merge is one of a vertical merge and a horizontal merge.

18 Claims, 7 Drawing Sheets

(56) References Cited

U.S. PATENT DOCUMENTS

2015/0378717 A1* 12/2015 Jacob ..................... G06F 8/65
717/124
2016/0092209 A1* 3/2016 Kuchibhotla ............ G06F 8/61
717/170

OTHER PUBLICATIONS

Dvorkin, "Continuous Integration—Strategies for Branching and Merging," Art of Software Engineering Blog, Jan. 30, 2013, p. 1-2, http://eugenedvorkin.com/continuous-integration-strategies-for-branching-and-merging/, Accessed on Nov. 11, 2015.
Kniberg, "Agile Version Control With Multiple Teams," InfoQ Articles, Apr. 4, 2008, p. 1-22, Version 1.2.
Seapine Software, "Collaborative Version Control with Surround SCM," Seapine Software Products, p. 1-16, http://www.seapine.com/surround-scm/overview, Accessed on Nov. 11, 2015.

* cited by examiner

STATEFUL DEVELOPMENT CONTROL

BACKGROUND

The present invention relates generally to the field of computing, and more particularly to source code control.

Source code for a software product is kept in a central repository from which all team members receive a copy of the files needed for their tasks. Following code modification and unit test, the changed files replace the original files, which are now part of the change history. The repository may contain multiple branches to separate code streams that are in different stages of readiness for commercial release. However errors may be introduced, for example, if a change to fix a defect is made in one branch but not properly propagated to the other branches. This may affect the quality of software developed using a continuous delivery paradigm, which abandons traditional development/release cycles in favor of short cycles where software can be reliably released at any time. A stateful development control system can identify the readiness of a file to be built into a product.

SUMMARY

According to an exemplary embodiment, a method for a stateful development control system is provided. The method may include receiving a plurality of product rules that include evolution rules, sets, and states. A state aware software repository is initialized with source code files. The source code files receive a first state of "0" or "1". In response to modifying one or more source code files, a second state is assigned to the modified one or more source code files. In response to assigning the second state, a determination is made whether to perform a merge of the one or more source code files and one or more of the source code files. The merge is one of a vertical merge and a horizontal merge.

According to another exemplary embodiment, a computer system for a stateful development control system is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method includes receiving, by a processor, a plurality of product rules, whereby the plurality of product rules include evolution rules, sets, and states. The method includes initializing a state aware software repository with source code files and assigning the source code files a first state, whereby the first state is "0" or "1". In response to modifying one or more source code files, the method assigns the second state to the modified one or more source code files. In response to assigning the second state, the method determines whether to perform a merge of the modified one or more source code files and one or more of the source code files, wherein the merge is one or more of a vertical merge and a horizontal merge.

According to yet another exemplary embodiment, a computer program product for a stateful development control system is provided. The computer program product may include one or more computer-readable storage devices and program instructions stored on at least one of the one or more tangible storage devices, the program instructions executable by a processor. The computer program product may include program instructions to receive, by a processor, a plurality of product rules, whereby the plurality of product rules include evolution rules, sets, and states. The computer program product includes program instructions to initialize a state aware software repository with source code files and assigning the source code files a first state, whereby the first state is "0" or "1". In response to modifying one or more source code files, the computer program product includes program instructions to assign a second state to the modified one or more source code files. In response to assigning the second state, the computer program product includes program instructions to determine whether to perform a merge of the modified one or more source code files and one or more of the source code files, whereby the merge is one or more of a vertical merge and a horizontal merge.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
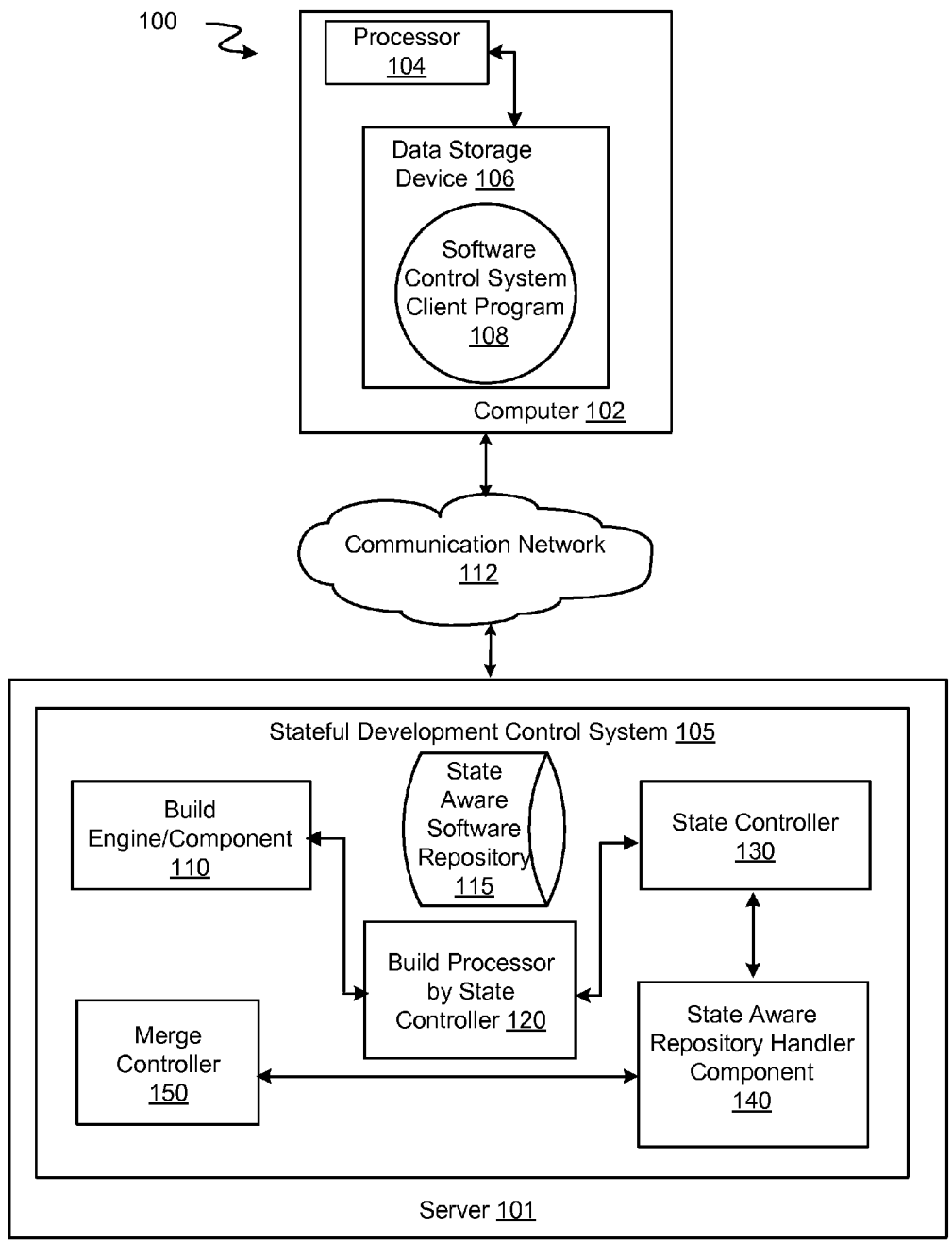
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for a stateful development control system. Additionally, the present embodiment has the capacity to improve the technical field of software development control.

As described previously, source code for a software product is kept in a central repository from which all team members receive a copy of the files needed for their tasks. Multiple branches traditionally separate code streams in the central repository that are in different stages of readiness, for example a branch for maintenance and a branch for new development. The stateful development control system stores and builds source code files according to customizable states, rather than by branches. This permits flexibility to build a product that is a combination of states, depending on configurable product rules. The configurable product rules include states, sets, and the rules by which a source code file evolves from one state to another. Using build-process-by-state, a developer can check in code once and have the modification apply to different states of the file(s), rather than having to commit changes in different streams.

The product rules and the stateful nature of source code files do not replace traditional version control. The software product that is publicly released may continue to have a version number for identification when calling for technical support and when comparing features between versions.

It may be advantageous to, among other things, avoid having multiple branches and, due to the stateless nature of the source code files, easily integrate source code files having different states into different releases.

FIG. 1 depicts an exemplary networked computer environment 100 according to at least one embodiment. The networked computer environment 100 may include a client computer 102 with a processor 104 and a data storage device 106 that is enabled to run a software control system client program 108. The networked computer environment 100 includes a server 101 that is enabled to run stateful development control system 105 and a communication network 112. The stateful development control system 105 includes new and modified functions that extend the capabilities of a software control system. The networked computer environment 100 may include a plurality of computers 102 and servers 101, only one of which is shown for illustrative brevity. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 101 via the communications network 112. The communications network 112 may include connections, such as wire, wireless communication links, or fiber optic cables. As will be discussed with reference to FIG. 6, server computer 101 may include internal components 800 and external components 900, respectively, and client computer 102 may include internal components 800 and external components 900, respectively. Client computer 102 may be any type of computing device capable of running a program and accessing a network.

Instances of the software control system client program 108 may execute on the same server 101 as the stateful development control system 105. Alternatively, instances of the software control system client program 108 may execute as remote clients, accessing the stateful development control system 105 using the communications network 112. The state aware software repository (repository) 115 contains the source code files belonging to various software development projects in various states. The product rules, which define the states and the movement of files between states, may be kept in the same repository 115, or in a separate database or data storage device 106. The build processor by state controller 120 uses the build engine/component 110 to generate building software products using information from the state controller 130. The state controller 130 uses the state aware repository handler component 140 to manage the various copies per state of source code files. The merge controller 150 uses the state aware repository handler component 140 to perform automated merges according to the product rules. The stateful development control system 105 is explained in further detail below with respect to FIGS. 2A and 2B.

Figure 2A:
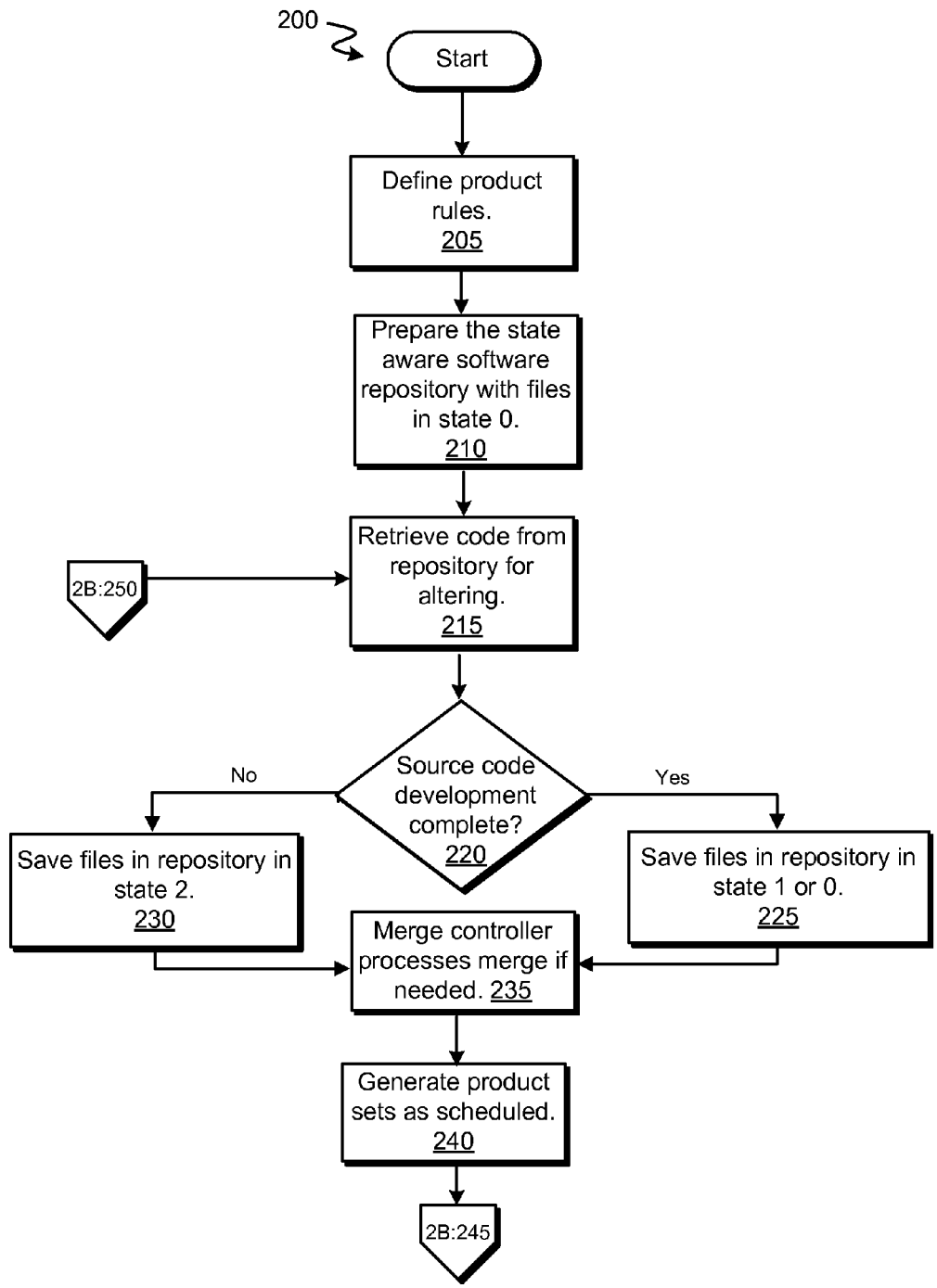
FIG. 2A is an operational flowchart illustrating a stateful development control system according to at least one embodiment.

FIG. 2A depicts an operational flowchart illustrating a stateful development control system 200.

At 205, administrators, such as release managers and release engineers, define product rules for the stateful development control system 200. A stateful service is one where subsequent requests to the service depend on the results of the first request. For the examples in this disclosure, the following suggested states and definitions are assumed:

TABLE 1

State Definitions

| States | Definitions |
|---|---|
| 0 | Stable code |
|  | Code changes that are related to defect fixing |
|  | The basis for all other states |
| 1 | Code that can be delivered, e.g., Beta |
|  | Contains new features |
|  | Code that can be ready or finished within a release cycle |
| 2 | Code under development |
|  | Code that cannot be ready or finished within an |
|  | iteration but needs to be delivered for testing purposes |
|  | Not ready to be released |

As shown in Table-2, a source code file can be assigned different states simultaneously in the repository 115 (FIG. 1). For clarity in presenting the examples, the file names and states in Table 2 map to $X_1, X_2, X_3, X_4$ in State 0, $Y_1, Y_4$ in State 1, and $Z_2, Z_3$, in State 2.

TABLE 2

Files in Various States

| States | One.java | Two.java | Three.java | Four.java |
|---|---|---|---|---|
| 0 | $X_1$ | $X_2$ | $X_3$ | $X_4$ |
| 1 | $Y_1$ |  |  | $Y_4$ |
| 2 |  | $Z_2$ | $Z_3$ |  |

Files $X_1, X_2, X_3, X_4$ are in State "0" since they are defined as the stable code files and are the basis for all states. However, files $Y_1$ and $Y_4$ are in an intermediate state, State "1". These files may contain new features, and may be ready for a controlled release, such as a Beta release, but are not considered ready for general release. Files $Z_2, Z_3$ are undergoing development, State "2". Therefore, each file (i.e., One.java, Two.java, Three.java, and Four.java) exists in the repository 115 (FIG. 1) in multiple states. According to the product rules, more than one type of release (i.e., generally available, controlled release Beta) can be built.

According to the product rules, more than one type of release (i.e., generally available, controlled release Beta) can be built. The type of release and the states of the files therein may be defined in the product rules as sets. For example, an Omega set includes only State "0" source code files, $\Omega=\{X_1, X_2, X_3, X_4\}$. This set represents the base or benchmark source code files. The Beta set includes source code files that can be a limited release, i.e., a release sent to a select and limited number of customers, $\beta=\{Y_1, X_2, X_3, X_4\}$. The Beta set can include both State "0"and State "1" files because these states have a level of stability, based on successful testing. The Alpha set includes at least one State "2" file, ie., source code under development, for example, α={$X_1$, $Z_2$, $Z_3$, $X_4$}. The product rules define the three main sets of Omega, Beta, and Alpha. Additional sets can be configured. For example, a gamma set can be configured whereby a release engineer chooses the state of the source code files to include. This may be helpful in building an initial release that contains a file to fix a defect. An individual developer may use the gamma set to include files under development with stables files for testing.

At 210, the repository 115 (FIG. 1) is populated with the source code files that form the basis for all other development work, shown in Table-2 as State "0". The state controller 130 (FIG. 1) in conjunction with the state aware repository handler component 140 (FIG. 1) assigns the initial state based on the product rules.

At 215 a developer retrieves one or more source code files for altering. If one or more of the source code files exists in more than one state, as in Table-2, the developer may choose which source code file(s) and in which state to check out. This allows the flexibility to mix source code in various stages of development into a code stream, for example to fix source code defects. The state controller 130 (FIG. 1) uses the state aware repository handler component 140 (FIG. 1) to manage the various copies per state of source code files.

At 220, following modification, the file(s) are saved to the repository 115 (FIG. 1), with the same state or with another state, according to the following rules:

TABLE 3

Permitted Save States for Files

| States When Retrieved From Repository | Permitted Save States |
| --- | --- |
| 0 | 0 |
| 0 | 1 |
| 0 | 2 |
| 1 | 1 |
| 1 | 2 |
| 2 | 2 |

Table-3 illustrates a stateful system because the subsequent request (i.e., permitted save state) depends on the results of the first request (i.e., the retrieved state).

If at 220 source code development completion is reached, then at 225 the file(s) are saved in the repository in State "0" or State "1". In this context source code development completion is reached when the source code file(s) successfully compile and complete unit test. As shown in the example in Table-1, States "0" and "1" can be assigned to file(s) that are ready for some form of release, such as generally available and controlled release Beta.

If at 220 the source code file(s) do not successfully compile or complete unit test, then at 230, the file(s) are saved in the repository in State "2".

At 235, the merge controller 150 (FIG. 1) processes a source code file merge, if the merge controller 150 (FIG. 1) determines that a merge is required. The stateful software control system 105 (FIG. 1) defines both vertical and horizontal merges. A vertical merge is performed by taking two different states of the same source code file and merging them. The merged file will take the state and the place in the software repository 115 (FIG. 1) of one of the merge inputs. There are several situations where a vertical merge is needed. For example, if a source code file exists in more than one state and the source code file in one of the states is modified, then a merge is performed with the higher states in order to promote this change. In this context, a higher state is one that is less stable. For example, although a State "2" is a higher state than a State "1" the State "2" code is still under development, whereas the State "1" code may be released. A horizontal merge is performed by merging two files of the same state.

At 240 the stateful software control system 105 (FIG. 1) generates product sets according to the configurable product rules. The product rules may specify that a build is performed according to a particular schedule, such as nightly, or that one or more product sets is produced.

Figure 2B:
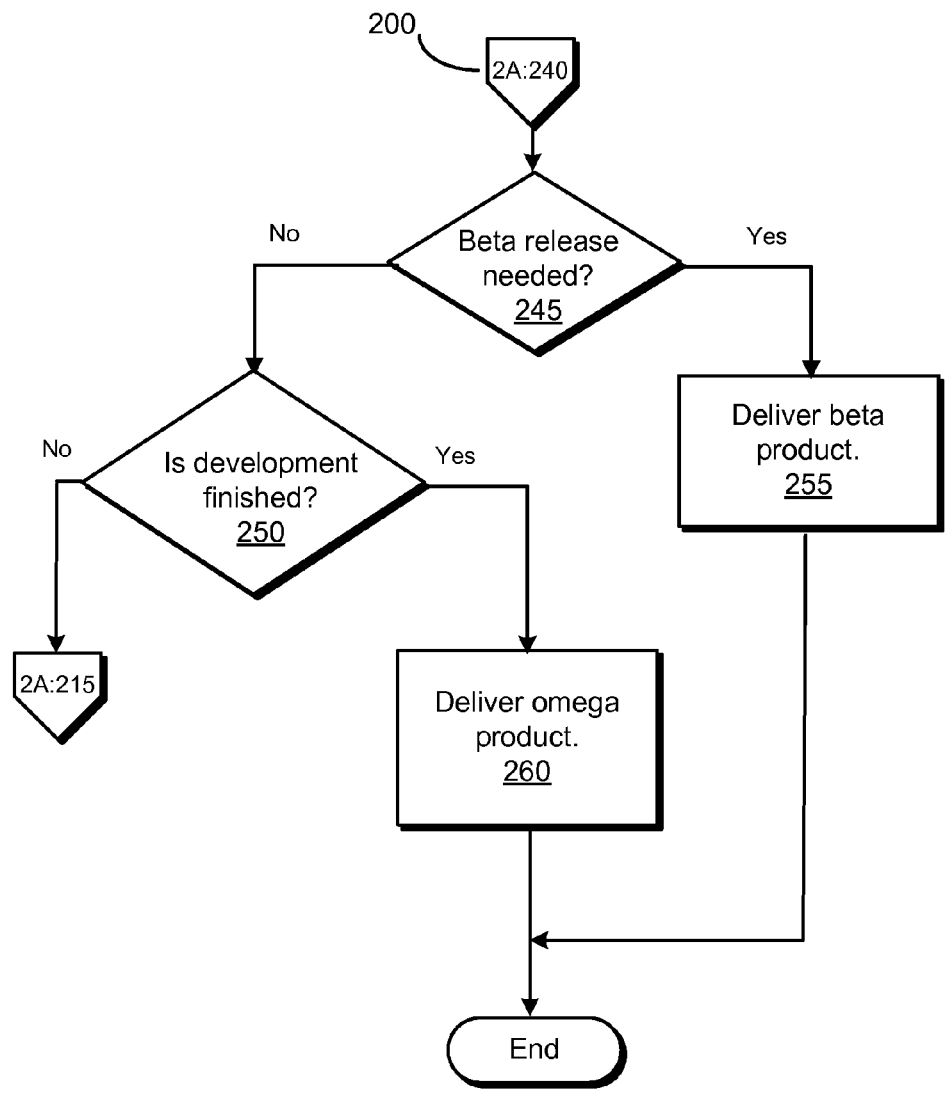
FIG. 2B is an operational flowchart further illustrating a stateful development control system according to at least one embodiment.

Continuing to FIG. 2B, at 245 the stateful software control system 105 (FIG. 1) determines whether a Beta release is needed, according to the product rules. If so, at 255 the build processor by state controller 120 (FIG. 1) uses the build engine/component 110 (FIG. 1) to generate the Beta product. The Beta product is generated from the Beta set, as defined in the product rules.

If at 245 the Beta release is not needed, then at 250 the stateful software control system 105 (FIG. 1) determines whether development is finished. In this context, development is finished when all the source code associated with a feature compiles and has successfully completed integration testing with existing source code and in state "0". In that case, at 260 the Omega product, built from the Omega set, is delivered externally, i.e., generally released to customers. However, if at 250 development is not finished, then processing returns to 215.

Figure 3:
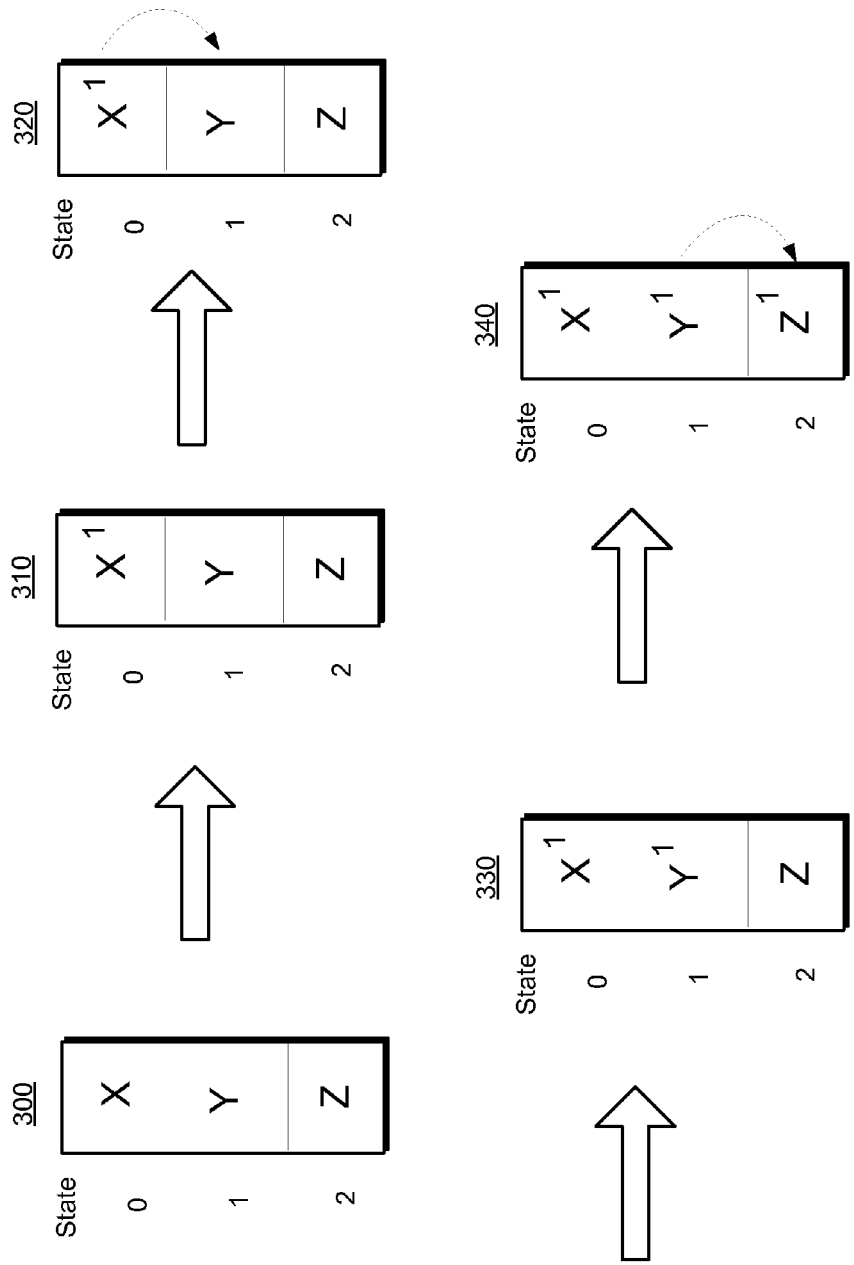
FIG. 3 is an operational flowchart illustrating a vertical merge of a file having three states according to at least one embodiment.

FIG. 3 shows a vertical merge operation involving a source code file in three states. At 300, the source code file exists in States "0", "1", and "2". 310 shows the source code file in State "0" is modified and saved to the software repository 115 (FIG. 1) as $X^1$. Therefore, at 320 a merge is needed from State "0" to State "1" (i.e., higher state) to promote the changes to under development code. This is shown at 330, when the changes to $X^1$ are merged into Y resulting in the modified $Y^1$. As in 320, a merge is needed from State "1" to State "2" to promote the modifications to $Y^1$ to Z which is the development state. This is shown in 340, where the changes to X are finally merged and promoted to $Z^1$.

Figure 4:
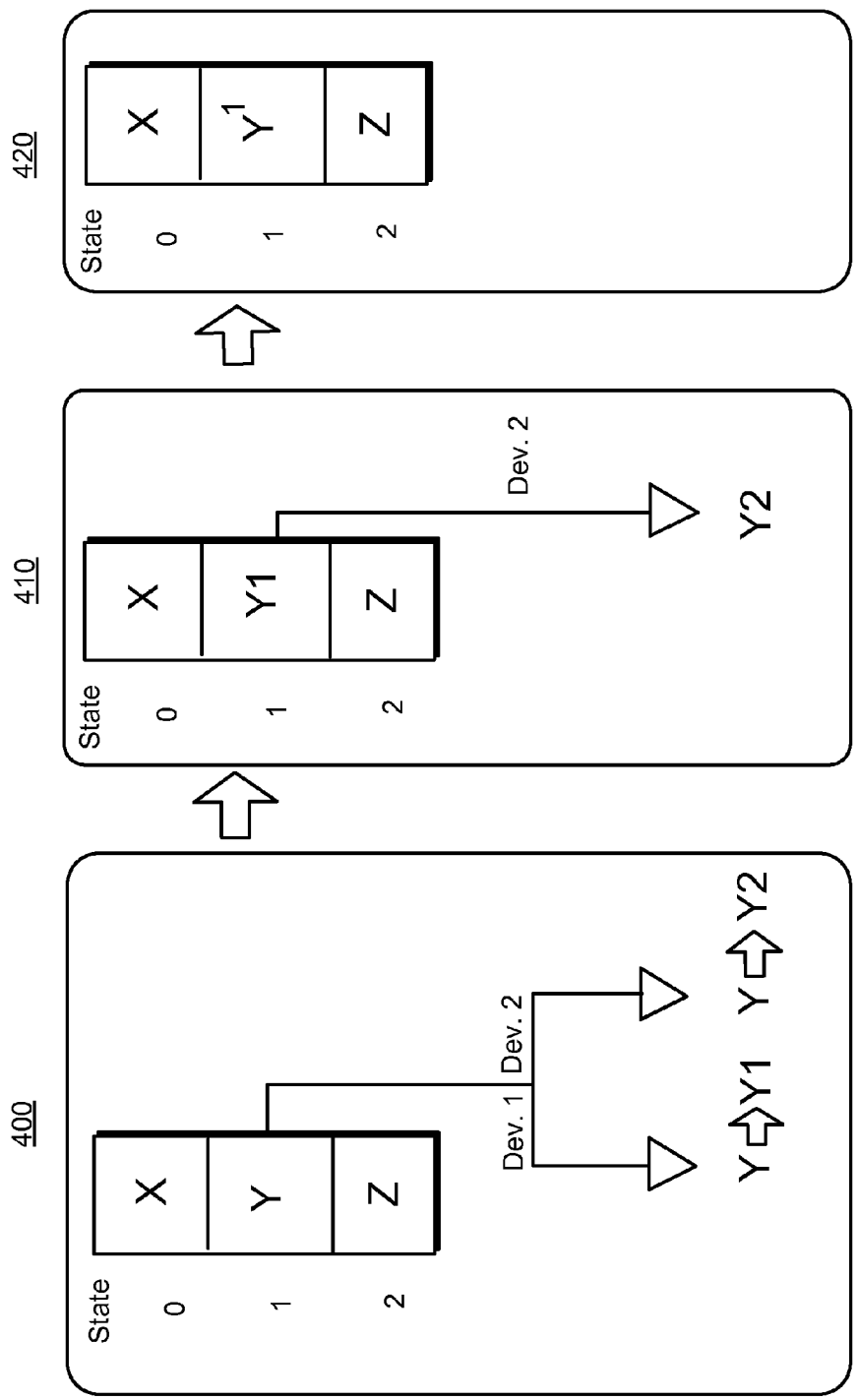
FIG. 4 is an operational flowchart illustrating a horizontal merge of a file.

FIG. 4 shows a horizontal merge operation. At 400 two developers retrieve the same source code file in the same state, State "1". Their modifications produce Y1 and Y2, respectively. At 410 developer-1 saves his changes in the software repository 115 (FIG. 1). Therefore, a horizontal merge between Y1 and Y2 is needed. At 420 the merge between Y1 and Y2 results in $Y^1$ which is saved in the software repository 115.

Figure 5:
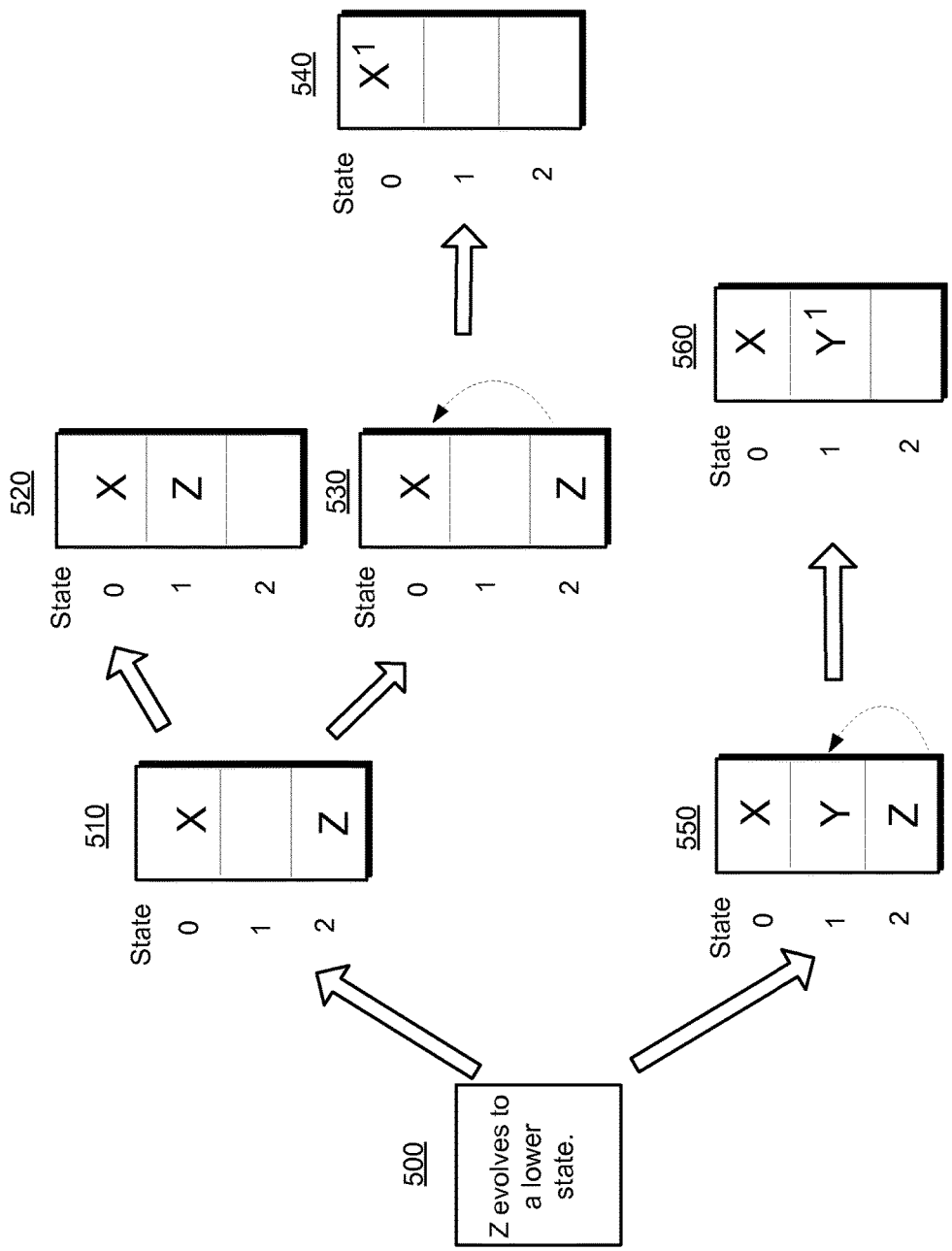
FIG. 5 is an operational flowchart illustrating evolution rules.

FIG. 5 shows evolution rules applied to a source code file. As the software in the software repository 115 (FIG. 1) matures over the course of multiple development cycles, the individual source code files can pass from higher states to lower states, i.e., evolve. Evolution rules maintain stability and quality in the software repository 115 (FIG. 1) by providing an orderly process by which source code files progress from development to stable release states.

For a first evolution rule, a source code file in State "n" can evolve to State "n−1" if either the source code file does not already exist in State "n−1" or after merging the two States "n" and "n−1". For a second evolution rule, a source code file in State "n" can evolve to State "n−2" only if this source code file does not already exist in State "n−1". A merge between the two States "n" and "n−2" is permitted if needed.

In the example of FIG. 5, at 500 source code file Z is in State "2" but is now ready to evolve to a lower state, i.e., "0"

or "1". The first evolution rule is illustrated in 510 through 540. At 510, there is no source code file in State "1". Z can evolve to either State "1" or State "0". However, to evolve to State "0", a merge is needed since the source code file exists in State "0". At 520, if the choice is to evolve Z to State "1", no merges are needed. At 530, if the choice is to evolve Z to State "0", the merge controller 150 (FIG. 1) may check if a vertical merge operation should be performed between States "0" and "2" first before evolving Z to State "0" at 540. In 540 Z is merged with X. The code in State "0" is no longer Z or X, but is $X^1$. The second evolution rule is illustrated in 550 and 560. In 550 Z can only evolve to State "1". However, before evolving Z to State "1" at 560, the merge controller 150 (FIG. 1) first checks if a vertical merge operation should be performed. In 560, Z is merged with Y. The code evolves to State "1", and is no longer Z or Y, but is $Y^1$.

Figure 6:
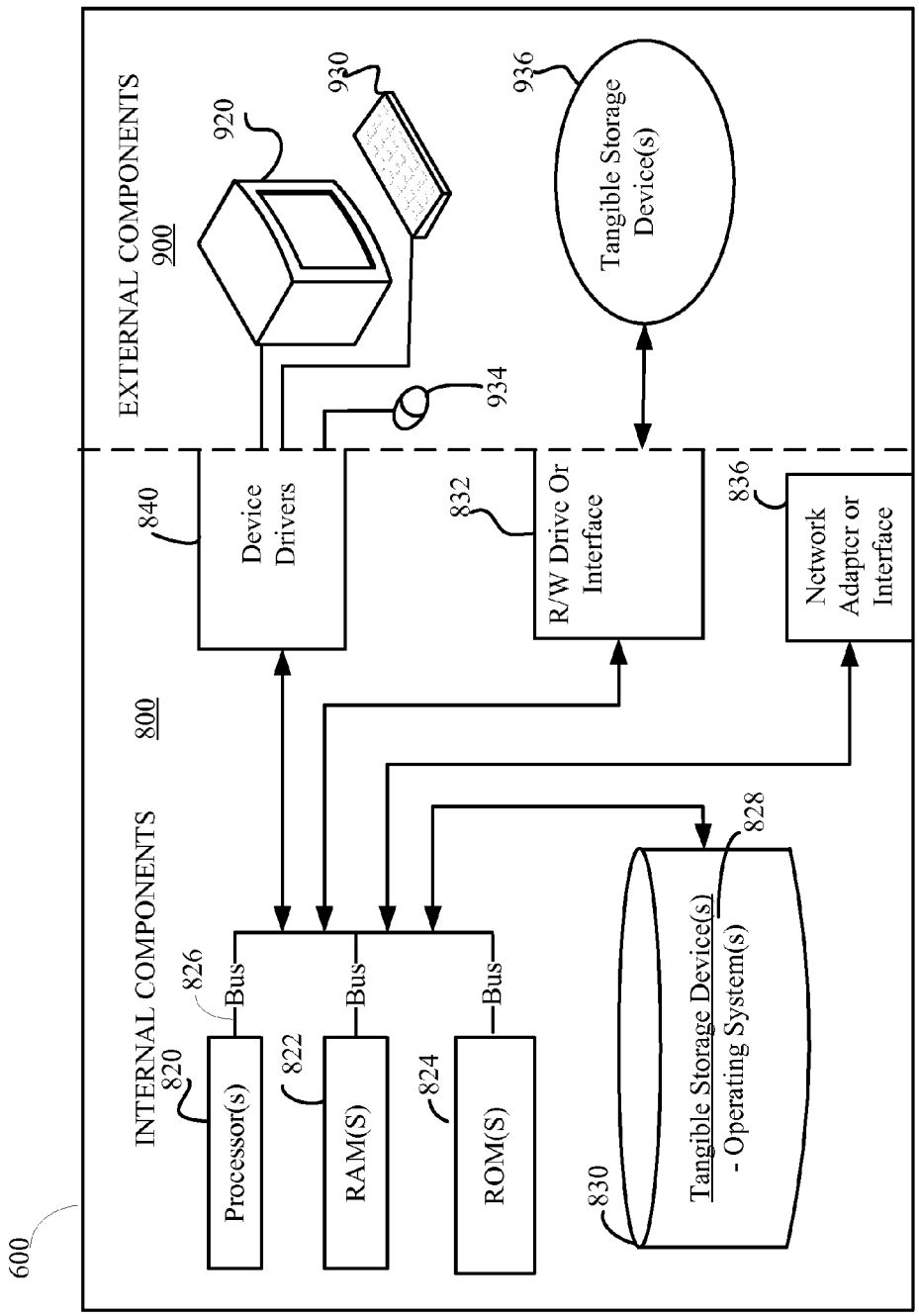
FIG. 6 is a block diagram of internal and external components of computers and servers depicted in FIG. 1 according to at least one embodiment.

FIG. 6 is a block diagram 600 of internal and external components of computers depicted in FIG. 1 in accordance with an illustrative embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User computer 102 (FIG. 1), and server 101 (FIG. 1) may include respective sets of internal components 800 and external components 900 illustrated in FIG. 6. Each of the sets of internal components 800 includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and programs such as a stateful development control system 105 (FIG. 1), may be stored on one or more computer-readable tangible storage devices 830 for execution by one or more processors 820 via one or more RAMs 822 (which typically include cache memory). In the embodiment illustrated in FIG. 6, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more portable computer-readable tangible storage devices 936 such as a CD-ROM, DVD, memory stick, magnetic tape, magnetic disk, optical disk or semiconductor storage device. The stateful development control system 105 (FIG. 1), can be stored on one or more of the respective portable computer-readable tangible storage devices 936, read via the respective R/W drive or interface 832 and loaded into the respective storage device 830.

Each set of internal components 800 may also include network adapters (or switch port cards) or interfaces 836 such as a TCP/IP adapter cards, wireless wi-fi interface cards, or 3G or 4G wireless interface cards or other wired or wireless communication links. The software control system client program 108 (FIG. 1) in client computer 102 (FIG. 1) and the stateful development control system 105 (FIG. 1), in server computer 101 (FIG. 1) can be downloaded from an external computer (e.g., server) via a network (for example, the Internet, a local area network or other, wide area network) and respective network adapters or interfaces 836. From the network adapters (or switch port adaptors) or interfaces 836, the software control system client program 108 (FIG. 1) in client computer 102 (FIG. 1) and the stateful development control system 105 (FIG. 1), in server computer 101 (FIG. 1) are loaded into the respective storage device 830. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for a stateful development control system, comprising:

receiving, by the stateful development control system, a plurality of product rules, wherein the plurality of product rules include evolution rules that define how each of a plurality of source code files evolve from one state to another, sets that define which source code foes and states are included in each set, and states that define a level of stability associated with each of the plurality of source code files, wherein the development control system includes one branch for all the source code foes in the development system without any sub-branches;

initializing a state aware software repository with source code files and assigning the source code files a first state, wherein the first state is "0" or "1";

in response to modifying one or more of the source code files, automatically assigning, by a state controller, a second state to the modified one or more source code files, based on the product rules;

in response to assigning the second state, determining, by a merge controller, whether to perform an automated merge of the modified one or more source code files and one or more of the source code files, wherein the merge is either both a vertical merge and a horizontal merge or either the vertical merge or the horizontal merge, depending on the product rules, wherein the vertical merge is performed by merging two different states of the same source code file from the one branch and the horizontal merge is performed by merging two source code files of the same state from the one branch; and based on the determination, performing the merge to build one or more product releases using the state of the source code files from the one branch and providing a continuous product delivery paradigm in short release cycles wherein the stateful development control system identifies readiness of the source code files to be built into the product release using the states of the source code files.

2. The method of claim 1, wherein assigning the second state further comprises:

in response to source code completion on the modified one or more source code files, assigning the second state to the modified one or more source code files in the state aware software repository, wherein the assigned second state is "0" or "1", based on the evolution rules; and in response to source code non-completion on the modified one or more source code files, assigning the second state to the modified one or more source code files in the state aware software repository, wherein the assigned second state is "2", based on the evolution rules.

3. The method of claim 1, wherein in the horizontal merge two source code files having a same state are merged.

4. The method of claim 1, wherein the vertical merge is performed between two different states of the same source code file, and wherein a merged file takes the state of one of the source code file inputs to the vertical merge in the state aware software repository.

5. The method of claim 1, wherein the source code file existing in a state "n" evolves to a state "n−1" if either the source code file is not already in the state "n−1" or after merging the source code file having the state "n" and the state "n−1".

6. The method of claim 1, wherein the source code file in the state "n" evolves to a state "n−2" based on the source code file not being in the state "n−1".

7. A computer system for a stateful development control system, comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

receiving, by the stateful development control system, a plurality of product rules, wherein the plurality of product rules include evolution rules that define how each of a plurality of source code files evolve from one state to another, sets that define which source code files and states are included in each set, and states that define a level of stability associated with each of the plurality of source code files, wherein the development control system includes one branch for all the source code files in the development system without any sub-branches;

initializing a state aware software repository with source code files and assigning the source code files a first state, wherein the first state is "0" or "1";

in response to modifying one or more of the source code files, automatically assigning, by a state controller, a second state to the modified one or more source code files., based on the product rules;

in response to assigning the second state, determining, by a merge controller, whether to perform an automated merge of the modified one or more source code files and one or more of the source code files, wherein the merge is either both a vertical merge and a horizontal merge or either the vertical merge or the horizontal merge, depending on the product rules, wherein the vertical merge is performed by merging two different states of the same source code file from the one branch and the horizontal merge is performed by merging two source code files of the same state from the one branch; and based on the determination, performing the merge to build one or more product releases using the state of the source code files from the one branch and providing a continuous product delivery paradigm in short release cycles wherein the stateful development control system identifies readiness of the source code files to be built into the product release using the states of the source code files.

8. The computer system of claim 7, wherein assigning the second state further comprises:

in response to source code completion on one or more of the modified source code files, assigning the second state to the modified one or more source code files in the state aware software repository, wherein the assigned second state is "0" or "1", based on the evolution rules; and in response to source code non-completion on the modified one or more source code files, assigning the second state to the modified one or more source code files in the state aware software repository, wherein the assigned second state is "2", based on the evolution rules.

9. The computer system of claim 7, wherein in the horizontal merge two source code files having a same state are merged.

10. The computer system of claim 7, wherein the vertical merge is performed between two different states of the same source code file, and wherein a merged file takes the state of one of the source code file inputs to the vertical merge in the state aware software repository.

11. The computer system of claim 7, wherein the source code file existing in a state "n" evolves to a state "n−1" if either the source code file is not already in the state "n−1" or after merging the source code file having the state "n" and the state "n−1".

12. The computer system of claim 7, wherein the source code file in the state "n"evolves to a state "n−2" based on the source code file not being in the state "n−1".

13. A computer program product for a stateful development control system, comprising:

one or more non-transitory computer-readable storage medium and program instructions stored on at least one of the one or more non-transitory computer-readable storage medium, the program instructions executable by a processor, the program instructions comprising:

program instructions to receive, by the stateful development control system, a plurality of product rules, wherein the plurality of product rules include evolution rules that define how each of a plurality of source code files evolve from one state to another, sets that define which source code files and states are included in each set, and states that define a level of stability associated with each of the plurality of source code files, wherein the development control system includes one branch for all the source code files in the development system without any sub-branches;

program instructions to initialize a state aware software repository with source code files and assigning the source code files a first state, wherein the first state is "0" or "1";

in response to modifying one or more source code files, program instructions to automatically assign, by a state controller, a second state to the modified one or more source code files based on the product rules;

in response to assigning the second state, program instructions to determine by a merge controller, whether to perform an automated merge of the modified one or more source code files and one or more of the source code files, wherein the merge is either both a vertical merge and a horizontal merge or either the vertical merge or the horizontal merge, depending on the product rules, wherein the vertical merge is performed by merging two different states of the same source code file from the one branch and the horizontal merge is performed by merging two source code files of the same state from the one branch; and based on the determination, performing the merge to build one or more product releases using the state of the source code files from the one branch and providing a continuous product delivery paradigm in short release cycles wherein the stateful development control system identifies readiness of the source code files to be built into the product release using the states of the source code files.

14. The computer program product of claim 13, wherein assigning the second state further comprises:
in response to source code completion on the modified one or more source code files, program instructions to assign the second state to the modified one or more source code files in the state aware software repository, wherein the assigned second state is "0" or "1", based on the evolution rules; and
in response to source code non-completion on the modified one or more source code files, program instructions to assign the second state to the modified one or more source code files in the state aware software repository, wherein the assigned second state is "2", based on the evolution rules.

15. The computer program product of claim 13, wherein in the horizontal merge two source code files having a same state are merged.

16. The computer program product of claim 13, wherein the vertical merge is performed between two different states of the same source code file, and wherein a merged file takes the state of one of the source code file inputs to the vertical merge in the state aware software repository.

17. The computer program product of claim 13, wherein the source code file existing in a state "n" evolves to a state "n−1" if either the source code file is not already in the state "n−1" or after merging the source code file having the state "n" and the state "n−1".

18. The computer program product of claim 13, wherein the source code file in the state "n" evolves to a state "n−2" based on the source code file not being in the state "n−1".

* * * * *